(12) United States Patent
Khechana et al.

(10) Patent No.: US 8,267,532 B2
(45) Date of Patent: Sep. 18, 2012

(54) PASSIVE ALIGNMENT METHOD AND ITS APPLICATION IN MICRO PROJECTION DEVICES

(75) Inventors: Faouzi Khechana, Crissier (FR); Lucio Kilcher, Montreux (CH)

(73) Assignee: Lemoptix SA, Lausanne (CH)

( * ) Notice: Subject to any disclaimer, the term of this patent is extended or adjusted under 35 U.S.C. 154(b) by 0 days.

(21) Appl. No.: 13/217,424

(22) Filed: Aug. 25, 2011

(65) Prior Publication Data

US 2011/0304828 A1  Dec. 15, 2011

Related U.S. Application Data

(63) Continuation of application No. PCT/EP2009/055427, filed on May 5, 2009.

(51) Int. Cl.
*G03B 21/14* (2006.01)

(52) U.S. Cl. ............ 353/122; 353/20; 353/31; 353/121; 353/119

(58) Field of Classification Search .................. 353/20, 353/31, 33, 34, 37, 81, 39, 119; 348/742, 348/743, 771; 359/630
See application file for complete search history.

(56) References Cited

U.S. PATENT DOCUMENTS

| | | | |
|---|---|---|---|
| 5,833,202 A | 11/1998 | Wolfgang | |
| 6,375,330 B1 * | 4/2002 | Mihalakis | 353/31 |
| 6,380,513 B1 | 4/2002 | DeGraffenried | |
| 6,649,435 B2 | 11/2003 | Liu et al. | |
| 7,238,621 B2 | 7/2007 | Krishnamoorthy et al. | |
| 7,834,867 B2 * | 11/2010 | Sprague et al. | 345/204 |
| 2002/0086458 A1 | 7/2002 | Liu et al. | |
| 2006/0114543 A1 * | 6/2006 | Bloom | 359/279 |
| 2006/0274273 A1 * | 12/2006 | Mihalakis | 353/20 |
| 2008/0086458 A1 * | 4/2008 | Robinson et al. | 707/3 |
| 2008/0158519 A1 * | 7/2008 | Malone | 353/81 |
| 2008/0225366 A1 * | 9/2008 | Hudman et al. | 359/212 |

FOREIGN PATENT DOCUMENTS

| WO | 9926754 A1 | 6/1999 |
|---|---|---|
| WO | 2007120831 A2 | 10/2007 |

OTHER PUBLICATIONS

International Search Report for PCT/EP2009/055427 with Written Opinion dated Oct. 5, 2009.

* cited by examiner

*Primary Examiner* — William C Dowling
(74) *Attorney, Agent, or Firm* — Blank Rome LLP

(57) ABSTRACT

An optical micro-projection system has at least one light source (401), at least one mirror (200) based on MEMS technology for deviating light from said light source, at least one beam splitter (403), and at least one wave plate (400). Each component has parallelepiped profiles with contact faces (500) on at least one side. Mutual alignment of at least two of the components is provided by mutual direct contact between reference contact faces (500) of the components. The architecture enables avoiding the use of dynamic optical assembly methods and to minimize the light loss within the system.

16 Claims, 14 Drawing Sheets

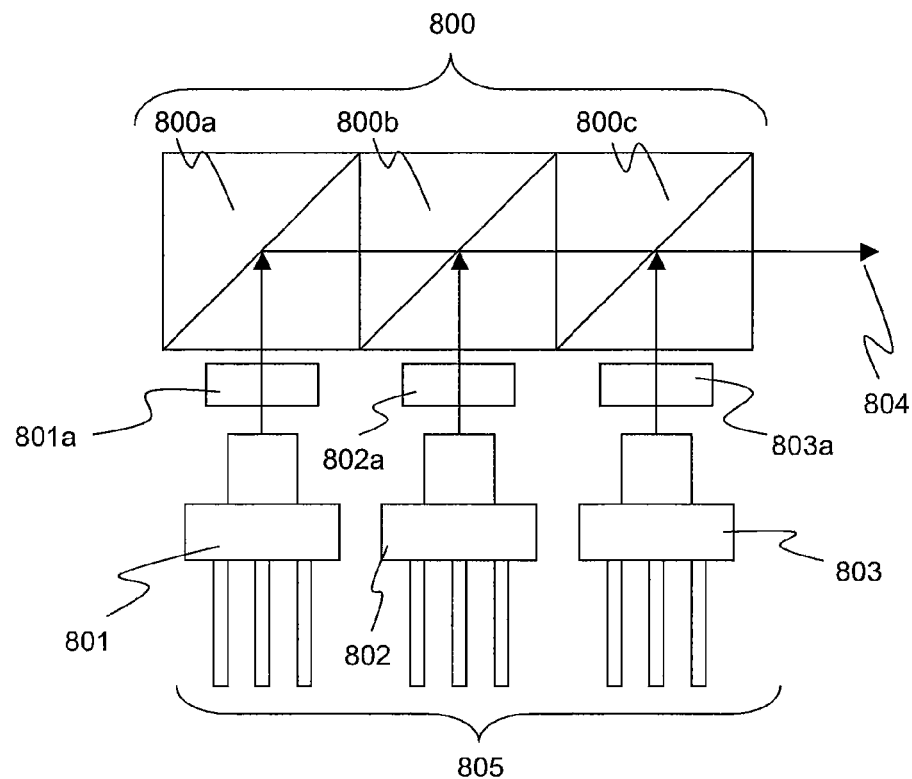
Figure 9A
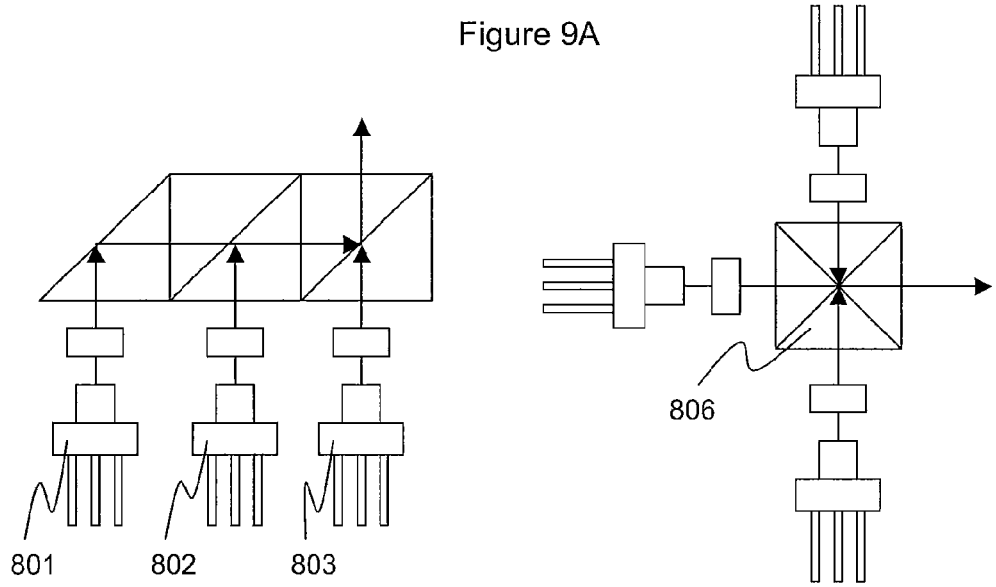
Figure 9B
Figure 9C

PASSIVE ALIGNMENT METHOD AND ITS APPLICATION IN MICRO PROJECTION DEVICES

RELATED APPLICATIONS

This application is a continuation of Application No. PCT/EP2009/055427 (WO 2010/127694) filed May 5, 2009, the contents of which is hereby incorporated in its entirety by reference.

FIELD OF THE INVENTION

The present invention relates to a micro-scanning and projection device having at least one light source, a beam splitter, at least one MEMS scanning mirror and at least one wave plate. It also relates to a method for assembling such a micro-projection system.

BACKGROUND OF THE INVENTION

Individual components of an optical system typically need to be aligned in order for the system to work efficiently and a small misalignment of each component to each other can cause severe efficiency losses or deviation in the optical path. There are currently two main techniques to assemble multiple optical components together: "Passive" and "Active" alignment techniques.

Classical alignment of optical components includes the use of complex external mechanical structures to accurately hold each of the individual components in their position. This fixation system is also known as Passive alignment method. Passive alignment methods are widely used for imaging optics, where the position of optical components does not need to be adjusted after the initial fixation. Depending on the complexity, size and precision of the optical system, the fabrication of such mechanical holding structure can be too complex to be fabricated with conventional machinery technologies. Additionally, the fabrication yield can be drastically decreased, then increasing the associated cost related to the assembling of such an optical system.

For precise optical components alignment, it is most of the time required to use Active setup technology, where each component is placed one after the other and their position is adjusted while the system is running. Active alignment methods are widely used in the case of small components using coherent radiation, such as laser diodes and other semi-conducting optical elements.

However, Active alignment methods can become very time consuming, and cost generating if more components have to be aligned together in order to form a complete optical system.

U.S. Pat. No. 5,833,202 to Adreasch Wolfgang, describes a mechanical fastening system in which standard micro-optical elements are initially mounted on respective one-piece frames, which in turn may be secured in position on a mounting plate. This fastening system involves complex assembly steps and provides poor alignment capabilities.

WO 99/26754 to Remy de Graffenried, describes a method for fixing miniaturized components onto a base plate by mean of a soldering joint. The disclosed method is very expensive to operate and provides relatively poor results with respect to alignment precision.

The document U.S. Pat. No. 7,238,621 describes a method for fabricating an optical device and micromechanical device, wherein both devices are monolithically integrated with a substrate. The optical surfaces and micromechanical devices are each formed in an etch step that is well-suited for forming that device. The disclosed embodiments enable the optical surface and micromechanical device to be fabricated irrespective of severe topography on the surface of the substrate. The etching steps required in this method require specific expensive equipment and involve complex manufacturing processes.

U.S. Pat. No. 6,649,435 (US2002/0086458A1) discloses a system and method of aligning a micro-mirror array to the micro-mirror package and the micro-mirror package to a display system. The system and method improve the alignment of the micro-mirror array to the display system by using a consistent set of precision reference regions. The micro-mirror package substrate engages an alignment fixture portion of a die mounted during the die mount operation, and a similar fixture when installed in a display system. The package substrate is held by the predefined regions on two edges and the three predefined regions on the top surface. When mounting the device in the package optical techniques may be used for x-y plane alignment. The use of packages or sockets increases the system complexity and considerably reduces the precision.

WO2007/120831A2 describes an integrated photonic module in which a plurality of optical components are maintained and aligned with an alignment frame.

Generally speaking, all those documents involves methods and systems featuring complex steps, and do not provide precise and reliable alignment of all the components.

For micro-projection applications, high accuracy assembling and alignment methods have to be used; this is notably the case for micro-mirror based scanning projection systems.

Micro-Electro-Mechanical-Systems (MEMS) having resonating micro-mirrors, are currently being used for projection purposes. The projection can either be done using a single mirror moving along two central and perpendicular axis (two degrees of freedom 2DOF), or two mirrors moving along a central axis (one degree of freedom 1DOF) both placed at 90 degrees one to each other. FIGS. 1 and 2 illustrate the two projection schemes. In FIG. 1A, the image is created by centering a collimated laser beam produced by lased 101 on the middle of the 2DOF micro-mirror surface 102 within the frame 105. The laser beam is reflected and deviated in two directions, so as to project a scanned image on the projection surface 104. In FIG. 1B, the projected image is created by centering a collimated laser beam on the first 1DOF micro-mirror surface 102. The laser is reflected to a second 1DOF micro-mirror surface 103 with the rotation axis placed at 90 degrees compared to the first 1DOF micro-mirror. During the actuation of the mirror(s), the collimated laser beam can be pulsed at a specific frequency to create an image with bright, dark and grayscale parts. A monochromatic image is projected when a monochromatic laser source is used. A multi color image can be projected when multiple different monochromatic laser sources are used simultaneously.

According to the previous projection system design, a precise alignment is needed between the laser source and the micro-mirror. As an example, when the reflective and moving part of the micro-mirror has a size of 1 mm square and a Gaussian distribution laser beam with a diameter of 0.5 mm at is 1/e intensity has to be aligned to hit the center of the mirror, the maximum misalignment can be of the order of 50-100 µm.

One consequence of a misalignment in the optical systems is the loss of light in the optical path, which induces a darker projected image and it may increase the temperature inside the projection system. Another consequence of such a misalignment is the lower light uniformity in the projected image.

Another consequence of misalignment of MEMS micromirrors with optical components for projection application is the projected image distortion.

As seen in FIG. 2, the MEMS micro-mirror is a movable structure 202 that classically moves out of the handled substrate plane 201. Therefore, the micro-mirror cannot be in direct contact with optical components, such as a lens or prism, because this will obstruct the mechanical movement of the micro-mirror.

The alignment of optical components obtained according to the above known methods presents problems. In particular, for precise alignment of multiple optical components, machine placement resolution becomes a critical bottleneck and induces alignment errors.

A further problem with these optical assembly setups for projection systems using moving parts, MEMS parts for example, is the fact that small mechanical holders are used, and mechanical fabrication tolerance adds further alignment errors.

A further problem with the assembly of MEMS micromirrors with optical components is the fact that for small size or complex design, Active alignment cannot always be used and then large alignment errors can occur.

A further problem with the assembly of MEMS micromirrors with optical components where no Active alignment can be used, is the fact that alignment problems are not detectable during the optical assembly phase, but can be only detected when all laser and MEMS driving electronic components are assembled to the optical components, causing difficulty to repair the defected projection system.

A further problem with known assembly and alignment methods is the high cost.

Thus, there is a need for a novel assembly technique and design for micro-optical components with MEMS micromirrors and MEMS components in general, that do not present the above mentioned drawbacks, namely the problems of the assembly techniques and design obtained by known methods.

US2006/0274273A1 discloses an optical imaging engine comprising a polarizing beam splitter, a quarter-wave retarder, a MEMS imaging device, the latter two components having flat surfaces mutually cooperating with each other. However, most of the described components such as the light source and the beam splitter do not have a parallelepiped profile. Accurate alignment of all the system components is thus not possible or involves complex alignment methods.

US2008/0158519A1 discloses a method of aligning a micromirror array to the micromirror package and the micromirror package to a display system.

SUMMARY OF THE INVENTION

According to the invention, these aims are achieved by means of an optical micro-projection system comprising the following components:
at least one light source;
at least one mirror based on MEMS technology for deviating light from said light source;
at least one beam splitter;
optionally, one wave plate for changing the polarization of the laser beam;
wherein each component have parallelepiped profiles with contact faces on at least one side and wherein mutual alignment of at least two of said components is provided by mutual direct contact between contact faces of said components.

Due to the contact faces, the micro-optical modules are assembled in direct contact with each other, alignment is simplified and more accurate. The proper alignment in the optical systems involves that there is no loss of light in the optical path, avoiding induction of a darker projected image and increase in temperature inside the projection system.

The contact faces are preferably optically flat (at least ¼ lambda, with lambda equal to 632.8 nm). This enables a perfect contact between the faces and provides easier alignment between the adjacent modules. Two adjacent contact faces preferably have at least approximately the same dimensions in order to offer a large contacting surface and precise alignment.

The modules are preferably provided with essentially parallelepiped shapes or profiles and more preferably rectangular or square profiles to provide easy alignment and assembly of the optical systems. The fact that all components are assembled in a stacked composition, and in contact to each other, considerably reduces the possible misalignment issues and makes the system very compact and mechanically stable.

The optional wave plate is preferably a lambda quarter wave plate. However, other wave plates are also possible, such as achromatic lambda quarter wave plate retarder, achromatic lambda half wave plate retarder, liquid crystal variable retarder, linear polarizer, dichroic filter, bandpass filter, hot and cold mirrors, groiting. Achromatic wave plate retarders guarantee almost no retardance variation over a defined wavelength range. The lambda quarter and half wave plate retarders may be made of polymer of quartz. The retarders may be zero order retarders (i.e. with no retardance variation for different incidence angles). One of more lenses may also be provided in the system.

In a variant, the components are arranged in a stack of mutually aligned components, one flat face of each component being in direct contact with one flat face of at least one other component of the stack. These features allow assembling micro-optical devices into a single monolithic block that combines the qualities of both active and passive technology. Thus, several optical components, manufactured with different technologies may be assembled in a stacked fixation, forming one single monolithic block.

In one embodiment, the optical micro-projection system comprises a frame for holding said components, at least some components comprising reference side faces for alignment with said frame. Such an arrangement enables the placement of the modules to be assembled along reference surfaces specifically adapted to provide quick and easy alignment. Precise reference side faces may however be omitted when a precise positioning of the optical components in any direction perpendicular to the optical path is not necessary.

In another variant, the MEMS component is a fully encapsulated scanning micro-mirror placed behind a cap window providing a contact face. Efficient integration of MEMS components with other types of components is thus possible, without alignment difficulties. MEMS mobile micro-mirrors may then be used in arrangements having contact faces.

In an advantageous embodiment, at least one of the modules is a lens made with gradient index medium integrated into parallelepiped (preferably rectangular or square) shaped component having at least one contact face provided by the gradient index medium. This face is adapted to directly cooperate with adjacent component, such as a quarter wave plate, mirror cap window, or other, providing reduced or no air space between the components when assembled together. For instance, in the case that the two lenses placed between the MEMS mirrors cap window and the two lambda quarter wave plates are made of a gradient index medium, the air space between the lens and the quarter wave plate or the mirror cap window will be completely removed. Optical losses due to air gap are thus eliminated.

According to another aspect, adjacent micro-optical components have the same refractive index. This provides a reduction of light losses at the interface. For instance, adjacent micro-optical components are made of the same optical material.

According to another aspect, optical components are attached together using assembling material or glue having a similar index of refraction as the components to be assembled. For instance, the gain in optical power is considerably higher if all the optical components are glued together by using an adhesive coating having an optical refractive index similar to the one of the beam splitter or the one of the micro-mirror cap window.

In a preferred embodiment, the MEMS micro-mirror cap window is made with similar material than the beam splitter in order to further reduce optical loss.

In a further embodiment, the optical system comprises at least two light sources placed parallel one to the others, and, during operation, the light beams are reflected into a beam splitter.

In a still further embodiment, the optical system comprises at least two light sources placed perpendicular one to the other, and during operation, the beam combiner transmit the combined light in the same direction as the output light source.

In yet another embodiment, three light sources are placed perpendicular one to the others with a central beam combiner.

In a further embodiment, the optical micro-projection system further comprises a beam combiner. The beam combiner enables color projection, using multiple laser sources. The beam combiner is preferably provided with at least two contact faces to enable easy placement and alignment of adjacent modules.

The light sources are advantageously provided in a laser holder for supporting said light source and providing at least one contact face. Various light sources may be selected, such as for instance: laser diode, Vertical Cavity Surface Emitting Diodes (VCSEL), collimated Light Emitting Diode (LED), Super luminescent Light Emitting Diode (SLED).

The invention also provides a method for assembling the above mentioned optical micro-projection system, comprising:

providing at least two substantially perpendicular reference planes;

placing optical system modules to be assembled in pre-assembling positions, said modules having parallelepiped profiles with at least one contact face, said contacts faces facing each other;

adjusting said modules in close cooperation with reference planes so that the modules are aligned for proper operation of the optical system;

placing the modules so that contact faces contact each other;

using assembling means to connect the modules in order to provide said optical system.

An advantage of this method is that the assembling process can then be performed by hand or by using automated systems. The different blocks can be fixed together with the use of different glues, for example UV cured glue or any other surface combining method, or with a component holder or frame.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which:

FIG. 9A shows an architecture for the mixing of multiple laser sources to achieve a single colored light beam.

FIG. 9B and FIG. 9C propose other color mixing techniques for the same purpose;

DETAILED DESCRIPTION OF THE INVENTION

For clarity, as is generally the case in representation of micro-systems, the various figures are not drawn to scale.

Figure 3A:
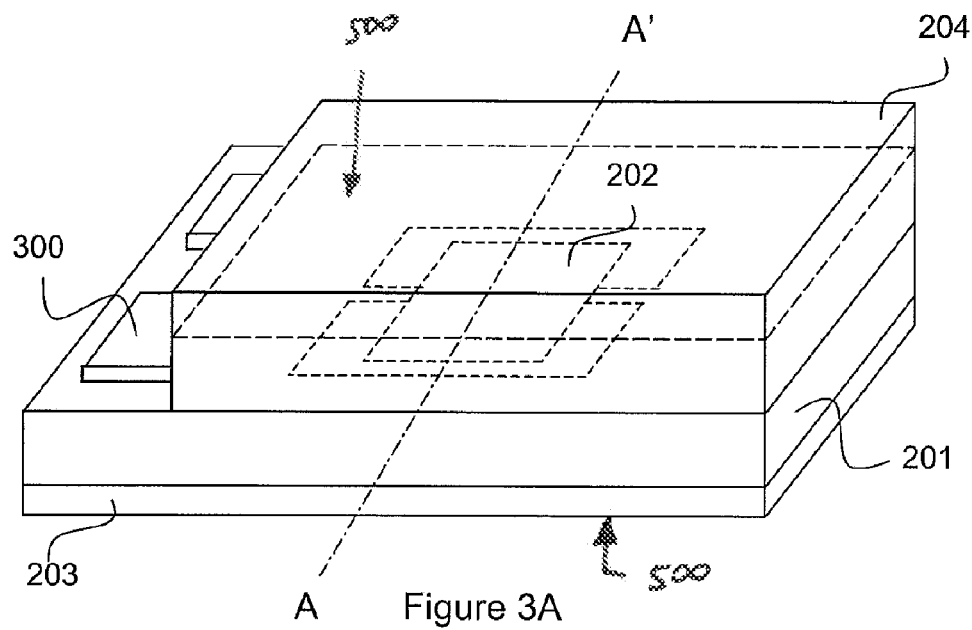
FIG. 3A illustrates a MEMS micro-mirror completely encapsulated with a cap wafer from both sides.
Figure 3B:
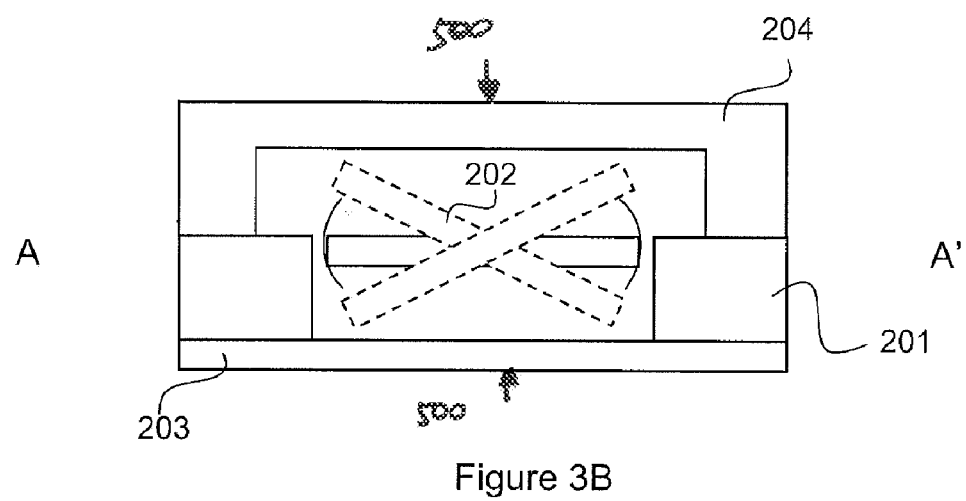
FIG. 3B is a cross section of FIG. 3A along the AA' section and show the actuation movement of the MEMS micro-mirror.

FIGS. 3A and 3B depict a fully encapsulated MEMS micro-mirror chip 200. The encapsulated MEMS micro-mirror chip 200 is composed of a cap with an optical window 204 that allows the light to penetrate and reflects on the micromirror surface 202 within the substrate 201. The cap optical window is typically made of glass, Pyrex or borofloat material. The micro-mirror surface can also be coated with reflective material such as gold, aluminum or silver, deposited in thin film, to obtain strong light reflection in the visible and Infra-Red wavelength. Optionally, the MEMS micro-mirror chip can also be packaged by a substrate 203 from the other side of the MEMS micro-mirror chip. Ideally, each transparent element should be coated on both sides with anti-reflective coating to avoid any parasitic light reflection.

The use of parallelepiped profiles and flat reference surfaces 500 on both sides of the encapsulated MEMS micro-mirror enables proper alignment with others mutually contacting components of the system.

Figure 4A:
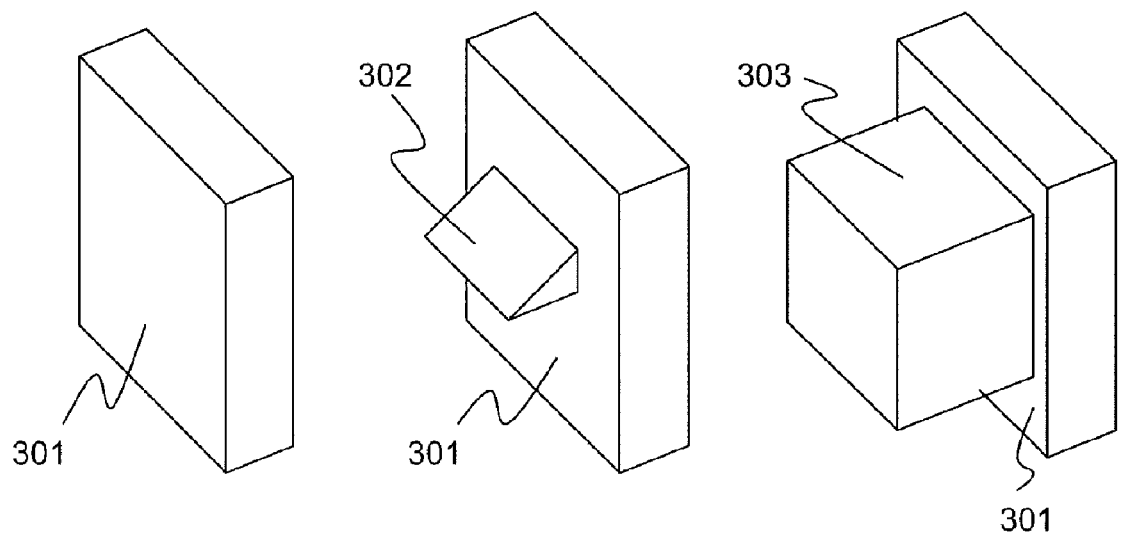
FIG. 4A illustrates the use of rectangular shaped blocks as optical components or optical components holder.

FIG. 4A shows the use of square or rectangular shaped blocks 301 as optical component or as holder for other optical items. The square blocks, independently if used as holder or not, can be made of glass, polymer, or other bulk or hollow material. Different components such as prisms 302, cubes 303 or lenses can be mounted on one or more faces of a parallelepiped holder 301. The optical components may be placed in the center of the holder 301, but it could be placed elsewhere if needed.

Figure 4B:
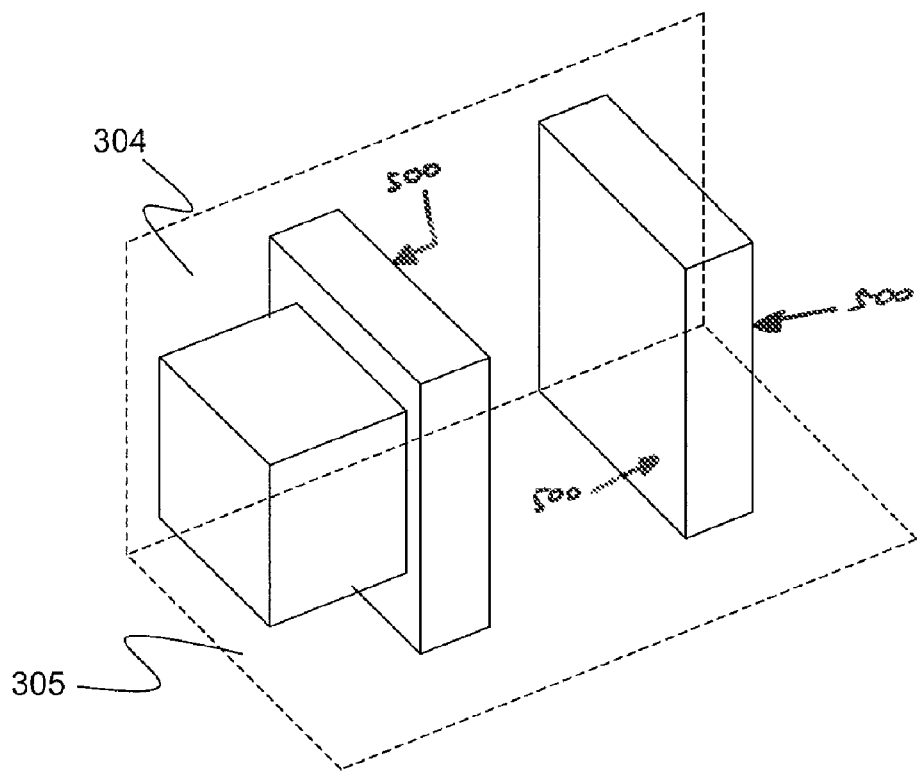
FIG. 4B illustrates a portion of a frame for maintaining the stack of mutually aligned components; this frame may also be provided with reference faces for the alignment of an optical stacked unit, based on rectangular shaped blocks, by using two faces of the rectangular blocks as alignment references.

Another aspect of the invention is related to the use of two or more lateral sides of those blocks 301 as alignment reference side faces during the assembling of the optical system. As shown in FIG. 4B, the assembling alignment is performed by using two rectangular holder sides as reference plane 304 and 305. The side faces of at least some components are in direct contact with those reference surfaces, thus providing precise mutual alignment without any need for adjustment. An advantage of this technique is that the assembling process can then be performed by hand or by using automated systems.

The different blocks can be fixed together with the use of different glues, for example UV cured glue or any other surface combining method. In another embodiment, the components are placed in a frame 310, comprising a plurality of side faces 304, 305, 306, for placement and alignment of the components. The side faces may be precisely machined for positioning and aligning the components in the frame; in most situations, however, reference side faces are not necessary, and the components are only aligned with respect to each other using their reference faces in direct contact.

Figure 4C:
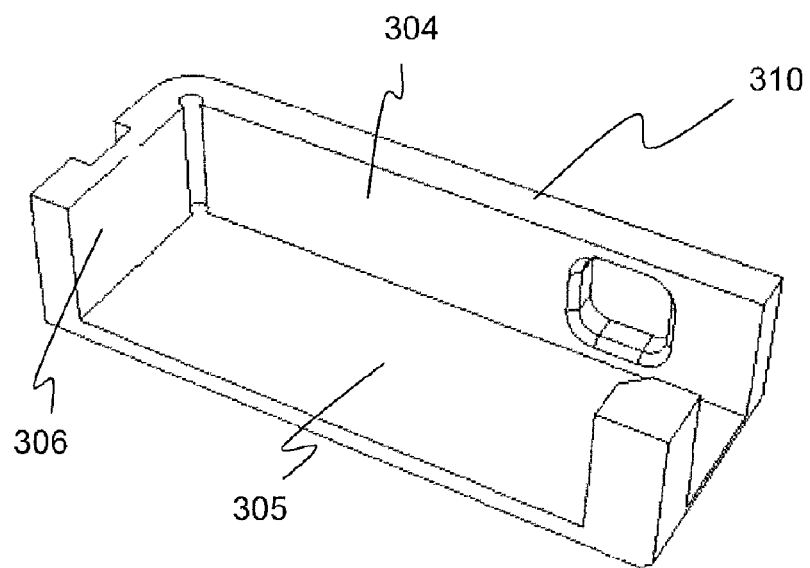
FIGS. 4C and 4D show a polymer or metal frame with the components aligned and fixed along the reference side faces, and a top wall that can be fixed with one or more clips.

In one embodiment, the frame in which the components are placed is shaped as shown in FIG. 4C. Such a frame enables positioning, and optionally alignment of the components in consideration of all directions, from the bottom to lateral sides, the top, rear and front, enabling accurate alignment during the assembling process of the optical system and ensuring the durability of this alignment. For instance, a PVC frame provides a cost effective solution. Other materials such as aluminum or copper or other metallic materials may also be used. The PVC or metal frame may be manufactured out of a bulk material with conventional machinery. Another possibility for manufacturing the frame may be with polymer of metal casting.

Figure 4D:
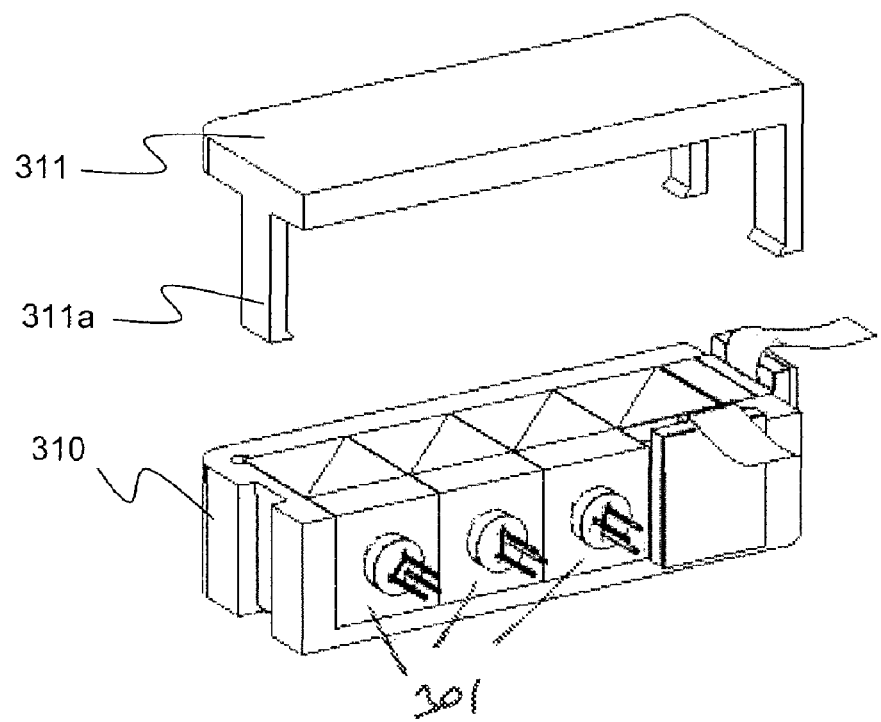

FIG. 4D shows a polymer or metal frame 310 with optical components fixed along the side faces. A top wall 311 can be fixed with one or more clips 311a to the base frame 310. The top wall may be helpful to protect the projection system from the dust. The top wall may be manufactured with the same material as the base frame.

Figure 4E:
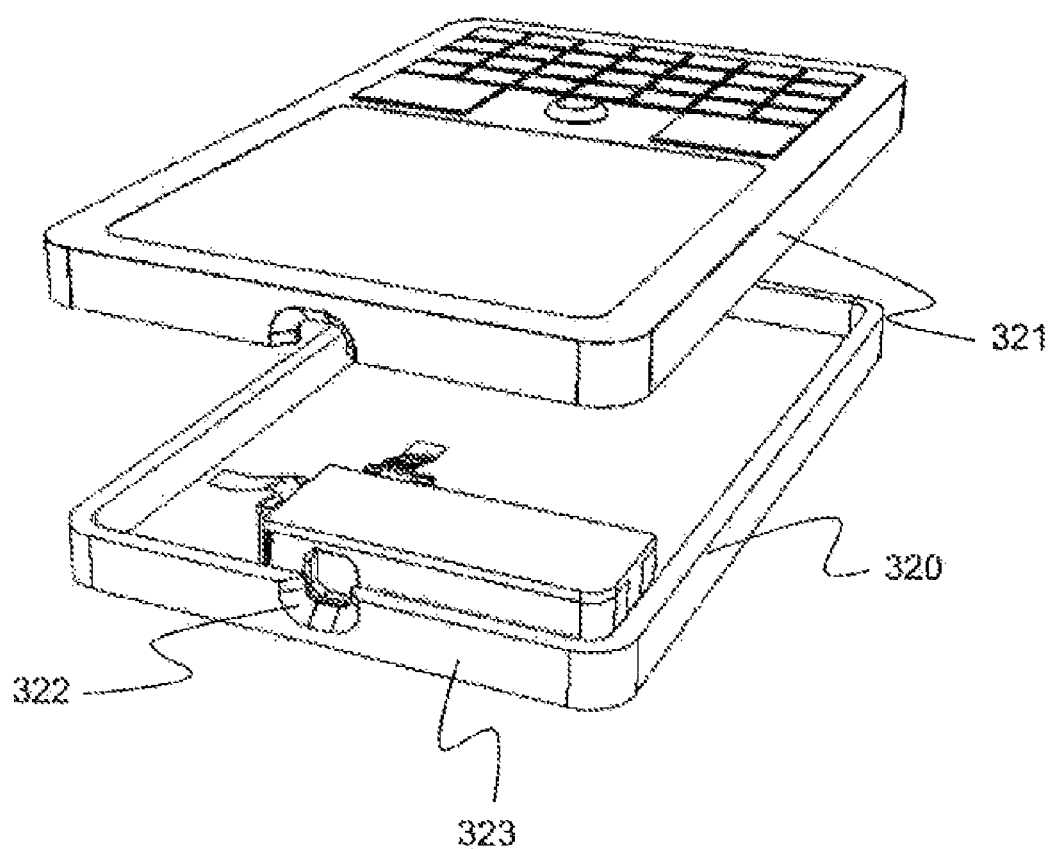
FIG. 4E shows an example of cellular phone in which an optical micro projection system has been integrated.

FIG. 4E shows an example of cellular phone in which an optical micro projection system according to the invention has been integrated. The micro projection system may be placed on the bottom part 320 of a cellular phone housing. The bottom 320 and upper part 321 of the cellular phone housing may have an aperture 322 for the laser beam, the aperture being placed on the middle of the phone front face 323.

Figure 5A:
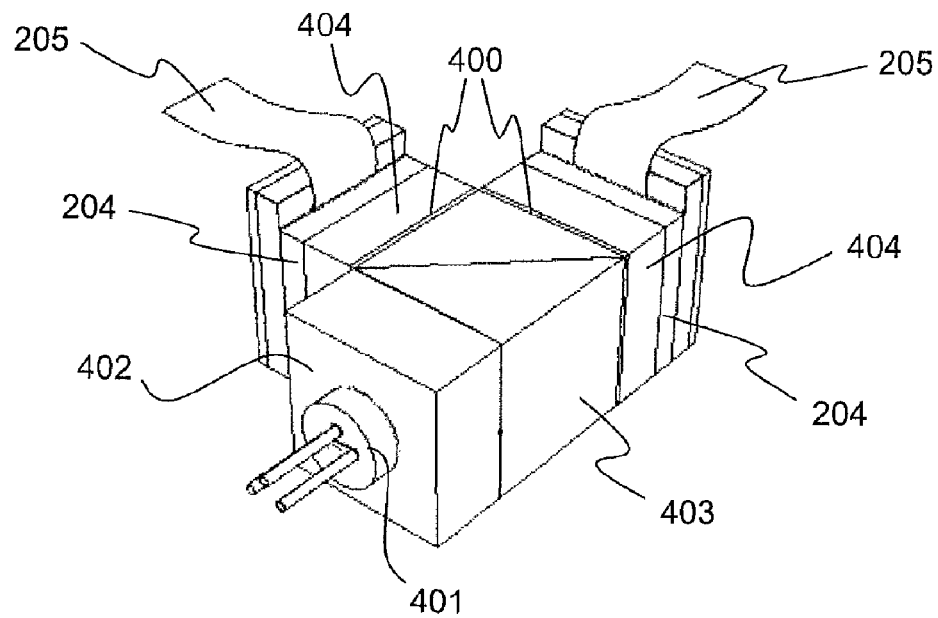
FIG. 5A is a view illustrating an assembly of two encapsulated and MEMS micro-mirrors having similar dimensions, with optical components and laser source.

Another aspect of the invention is presented in FIG. 5A, where two micro-mirrors having caps 204 and that move individually along one rotation axis (1 DOF) are fixed on two different faces of a polarizer cube beam splitter 403, together with two lambda quarter wave plates 400, two glass or polymer lenses 404 and a laser source 401 placed in an optimized laser holder 402 in which a glass or polymer collimation lens can be inserted. All those components are provided using shapes and profiles involving flat contact faces 500 (shown in FIGS. 3B, 4B, 5B and 6B) such as rectangular or square shape that allows assembling them in a stacked composition. Because the MEMS micro-mirror cap window 204 is made of Pyrex or borofloat material, the micro-mirror can be directly placed in contact with the other adjacent optical components. The fact that all components are assembled in a stacked composition, and in contact to each other, considerably reduces the possible misalignment issues and makes the system very compact and mechanically stable. Centering and mutual alignment of the modules using the reference side faces is also advantageous. Reference 205 designates the electric cables for driving the MEMS.

An improvement of the system, that could be used independently, is proposed to reduce the optical losses by the removal of the air gaps in the whole stacked optical system. Air gaps appear among other when the contact surfaces of each optical component are not completely flat. As can be seen on FIG. 5B, at least two lenses 404 are used in the micro projection system, these lenses are typically made of glass or polymer material. In this embodiment, their surface can be round or aspheric, thus creating air gaps between the lens and the neighborhood modules.

In order to remove this air gap, the non-flat lenses are preferably replaced by lenses 404 made of gradient index medium, and having flat external surfaces. The air space between the lens 404 and the quarter wave plate 400 or the mirror cap window 204 may thus be completely removed.

Gradient Index (GRIN) lenses are already known in the art of optics, and used to focus and collimate light within a variety of materials or components. GRIN lenses focus light through a precisely controlled radial variation of the lens material's index of refraction from the optical axis to the edge of the lens. Such technology enables providing lenses, including for example collimating lenses, with flat faces. Those faces are used as the contact faces 500. By gradually varying the index of refraction within the lens material, light rays can be smoothly and continually redirected towards a point of focus. The use of GRIN lenses with the micro-projection system of the invention allows providing accurately controlled refraction variations within parallelepiped shapes such as rectangular or square shaped blocks, thus avoiding concave or convex external faces.

Figure 5B:
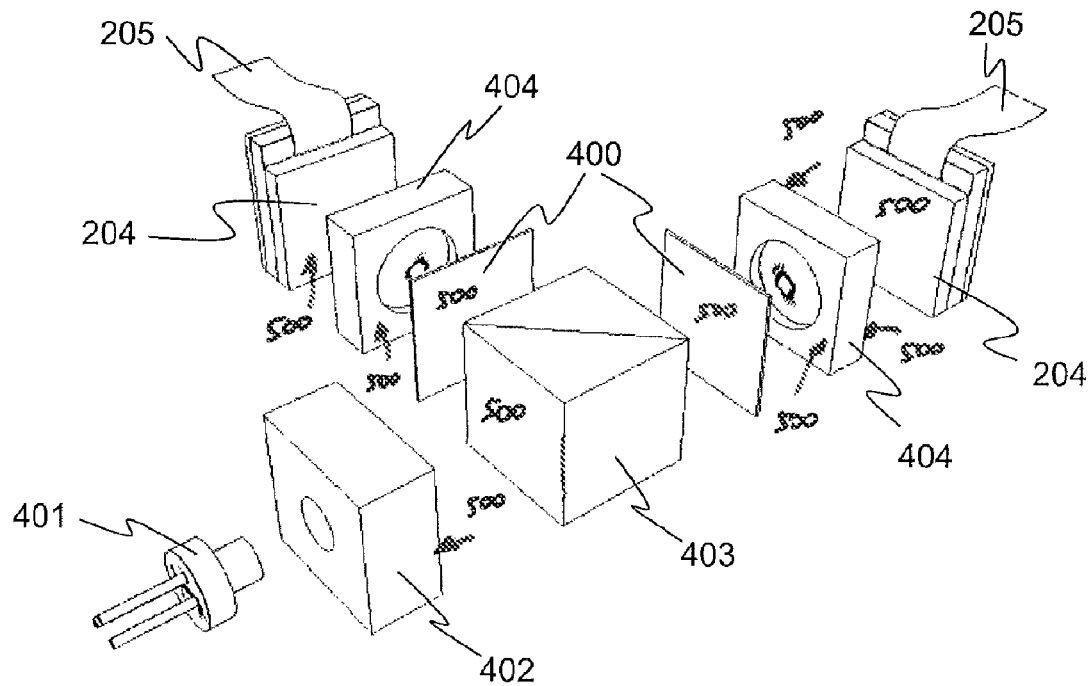
FIG. 5B illustrates the same architecture with exploded elements.

FIG. 5B shows an exploded view of FIG. 5A with all the individual components of the scanning and projection system being provided with contact faces 500 arranged for mutual cooperation with each other. The laser holder 402 on FIG. 5B is composed of an individual component having a square or rectangular shape, and one of its sides is in contact with the central cubic beam splitter 403. The laser holder 402 can be manufactured with a cylindrical hole that is preferentially placed at the center of the holder but it could also be placed elsewhere if the laser chip 401 has a specific beam shape that requires such placement in order to optimize the light going through the optical system.

Figure 7A:
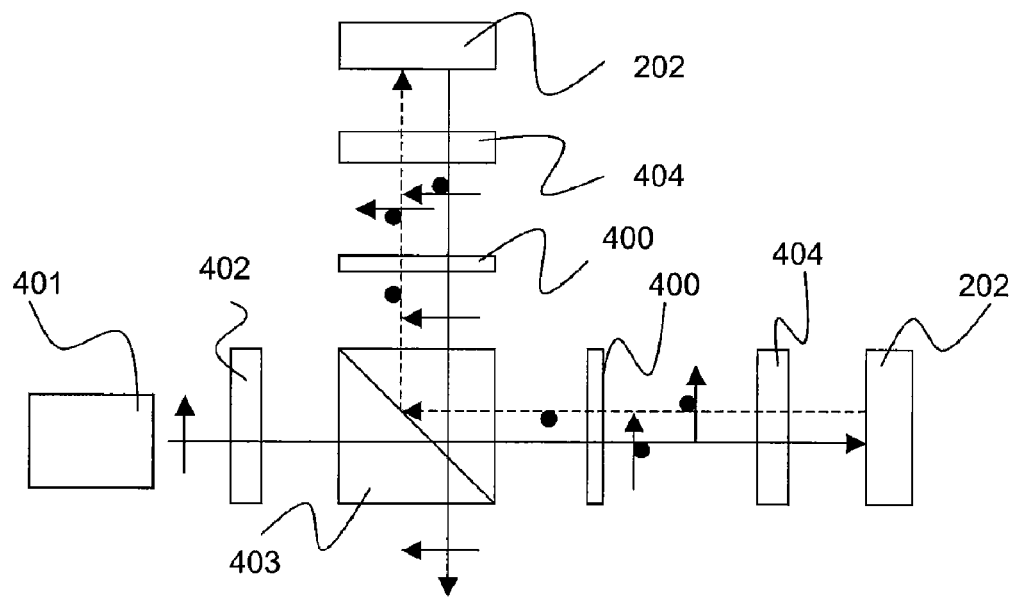
FIG. 7A shows the working principle of the micro projector based on the architecture illustrated in FIG. 5A.

The working principle of the optical system of FIG. 5A is presented in FIG. 7A where the laser beam goes out of the laser diode 401 with two equal or different divergence angles, passes through the lens 402 in the laser holder that is placed at a distance from the laser diode emitting surface equal to his focal length, in order to collimate the light with elliptical or circular shape. Elliptical shape is achieved if the laser diode divergence angles differ one from each other. Circular shape is achieved if the two divergence angles are equal or a special circularizer optical element is added to the lens 402.

The collimated and horizontal linear polarized laser beam, represented with an arrow on FIG. 7A, has to match with the polarizer cube beam splitter 403 coating in such a way that the majority of the light is transmitted through the cube beam splitter 403.

The horizontal polarized light beam going out of the cube beam splitter 403 passes through a quarter wave plate 400 and a lens 404 that makes the beam circular polarized and focused. In FIG. 7A the circular polarized light is represented by a series of arrows and dots. The circular polarized light is focused on the MEMS micro-mirror surface 202. The MEMS micro-mirror surface 202 reflects the incoming light back to the lens 404 and the quarter wave plate 400. The light is now collimated and vertically polarized, the vertical polarization of the light is represented by a dot on FIG. 7A.

The vertical polarized light is now mostly reflected by the cube beam splitter 403 coating surface. Another quarter wave plate 400 and a lens 404 make the beam circular polarized and focused on the second MEMS micro-mirror 202. By reflection the beam passes through both components for a second time making the light beam collimated and horizontally polarized. The laser beam is transmitted through the cube beam splitter 403 and directed to the projection surface.

The proposed architecture depicted in FIG. 5A allows minimizing light loss in the system and greatly reduces the problems of optical alignment of the components by using the mechanical characteristics of the encapsulated MEMS micro-mirror 200 and the other optical components. The scanning and projection system of FIG. 5A has also the advantage to allow the use of two micro-mirrors with similar reflected surface size and similar chip size, reducing the assembly complexity.

Another advantage of the architecture presented in FIG. 5A consists in the fact that the light beam is focused on both MEMS micro-mirror surfaces 202, allowing the reduction of the mirror size. The reduction of the MEMS micro-mirror reflective and moving part size 202 allows the increment on the mirror sweep frequency that is directly related to the resolution of the projected image that can be therefore incremented as well.

Figure 6A:
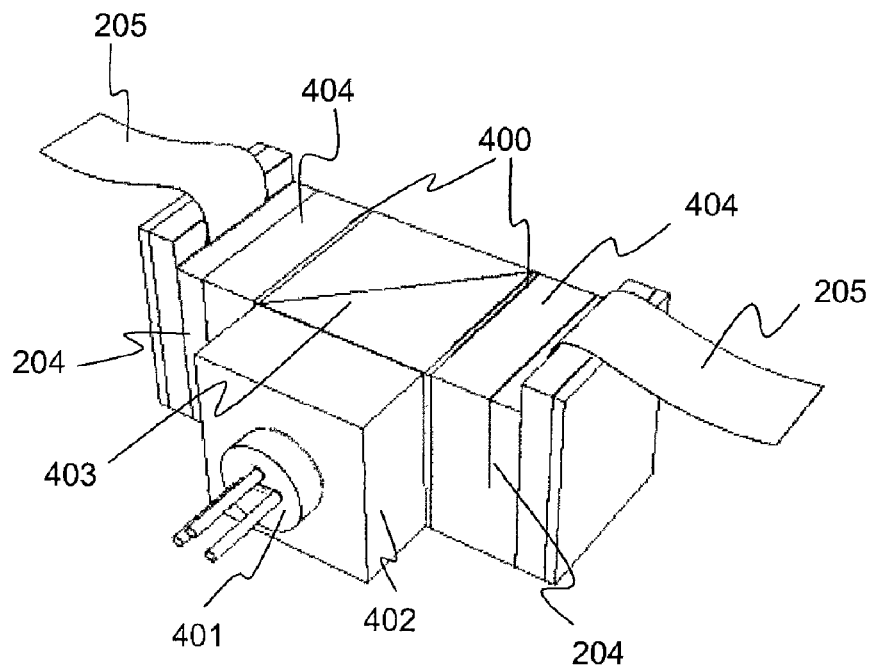
FIG. 6A illustrates a variation of the architecture presented in FIG. 5A where the MEMS micro-mirrors are placed one in front of each other.
Figure 6B:
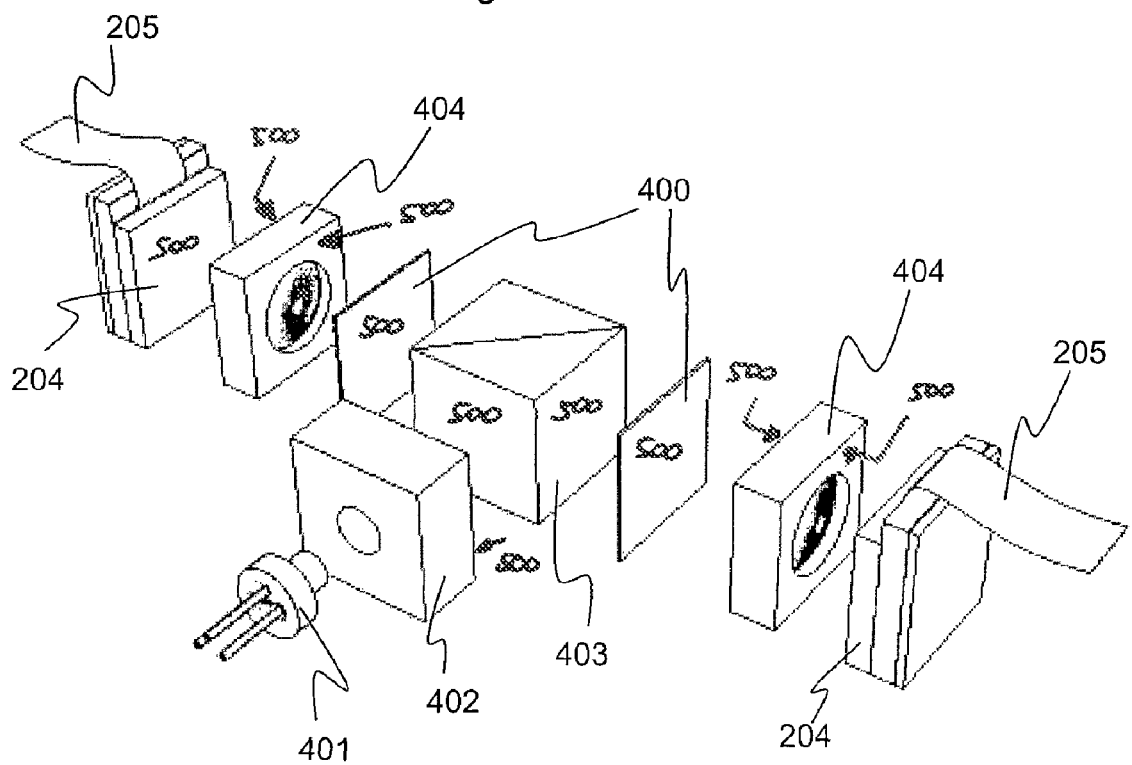
FIG. 6B illustrates the same architecture with exploded elements.
Figure 7B:
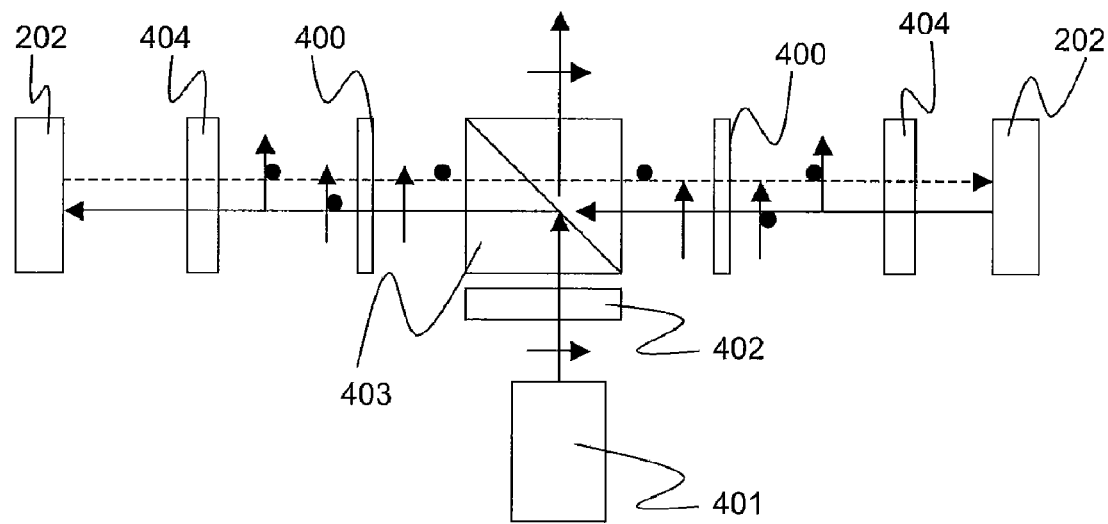
FIG. 7B shows the working principle of the micro projector based on the architecture illustrated in FIG. 6A.

Another proposed optical architecture for scanning and projection applications is presented in FIG. 6A where the two MEMS micro-mirrors 200 are placed one in front of each other. This optical projection system, shown as exploded view in FIG. 6B, works in a similar way as the one proposed in FIGS. 5A/5B. The principal characteristics of this architecture, compared to the one proposed in FIGS. 5A/5B, relates to the light beam transmission through the cube beam splitter 403. The optical working principle of the architecture shown in FIG. 6A is depicted by FIG. 7B. The described architecture of FIG. 7B has the advantage as compared to the architecture of FIG. 7A that the light intensity loss is reduced. Indeed, in the architecture of FIG. 7A, the light beam reflects only once on the cube beam splitter 403 and is transmitted two times through the total length of the beam splitter 403, whereas in the architecture of FIG. 7B, the beam reflects two times on the cube beam splitter 403 and is transmitted once through the total length of the cube beam splitters. Cube beam splitters typically shows better reflection efficiency as transmission ones, therefore, the architecture depicted in FIG. 7B has less light losses compared to the architecture depicted on FIG. 7A.

Figure 1A:
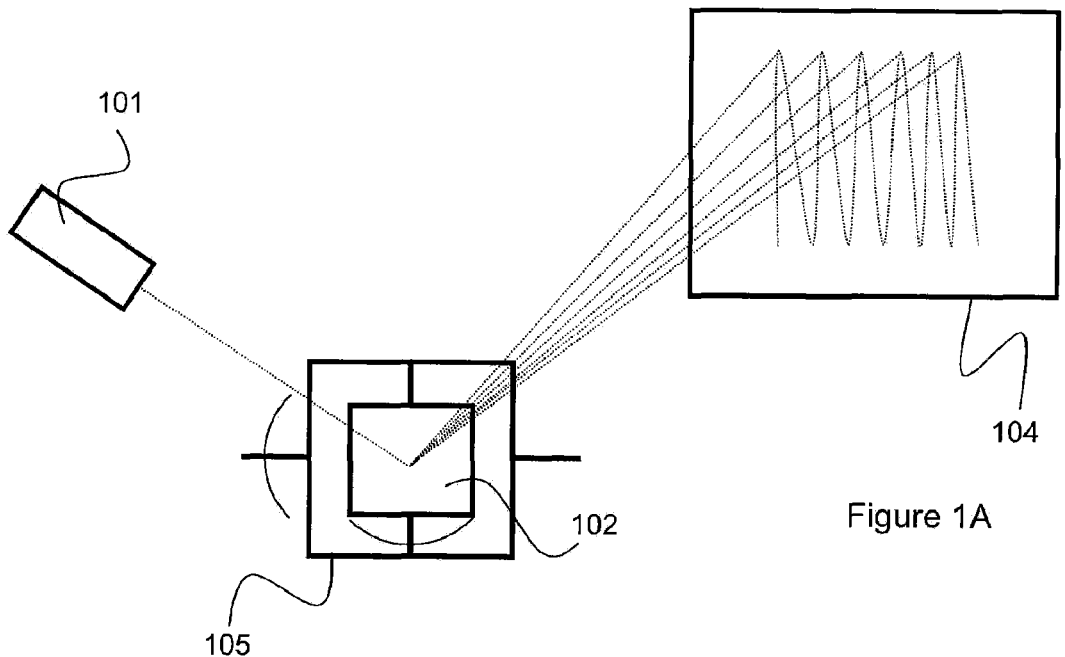
FIGS. 1A and 1B, described above, illustrate examples of known MEMS micro-mirror-based projectors using respectively a single mirror moving along two perpendicular axes, or two Degrees Of Freedom (2 DOF), and a projector using two MEMS micro-mirrors moving along one axis (1 DOF)
Figure 1B:
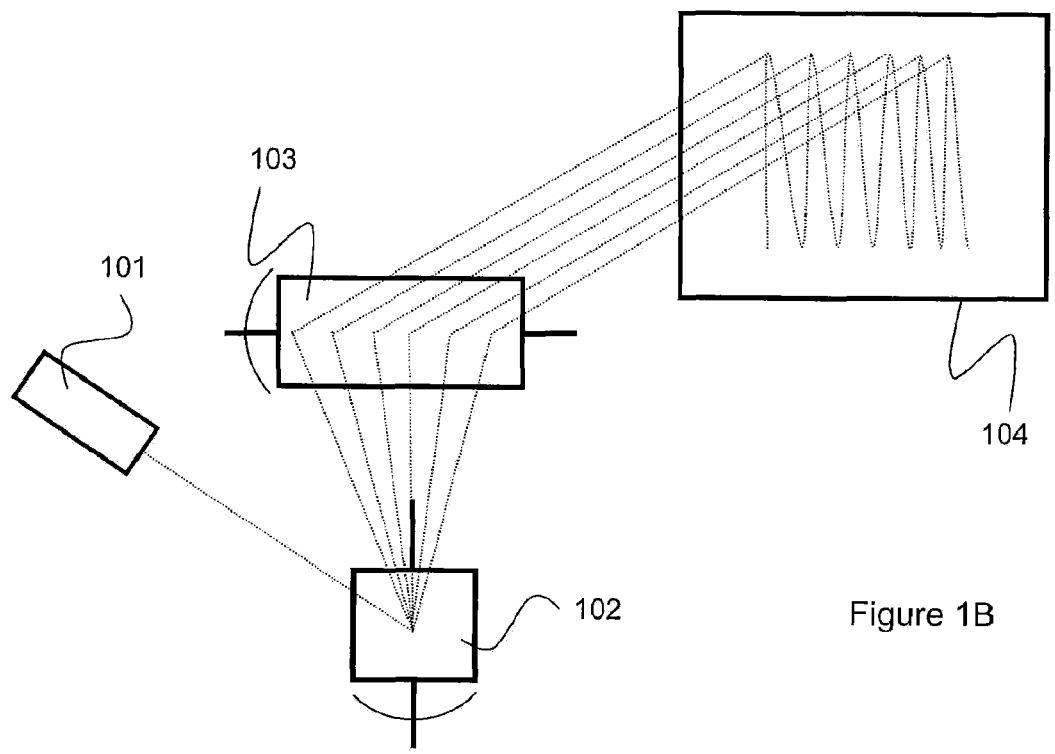
Figure 8A:
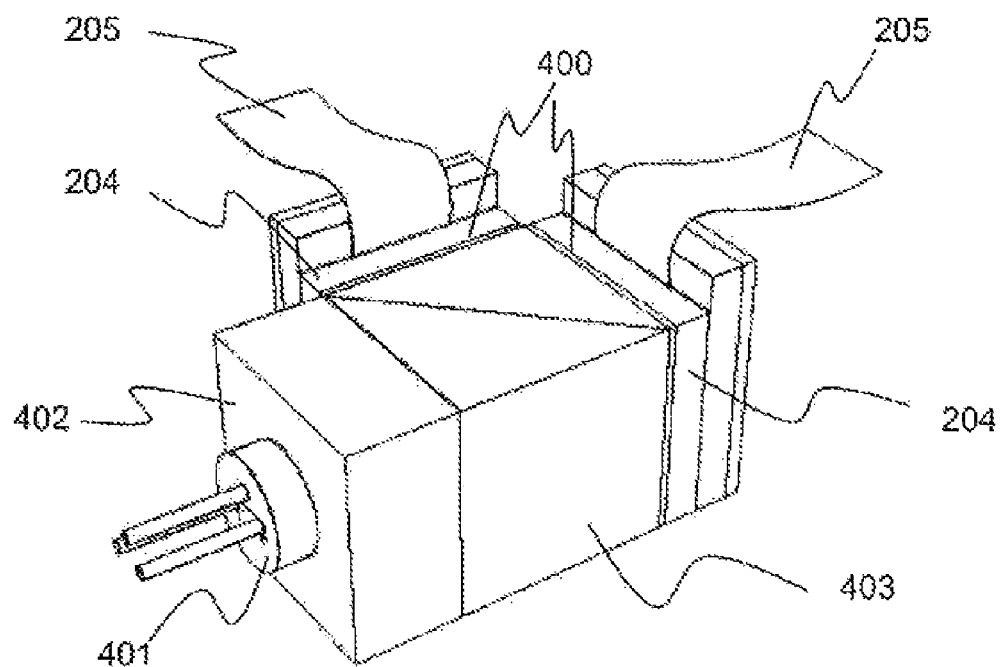
FIG. 8A illustrates projection architecture without the need of the lenses 404 between the cube beam splitter and the two mirrors.

Another proposed optical architecture for scanning and projection purposes, is the one depicted in FIG. 8A, where the optical system works properly without the need for the two lenses 404. In the embodiment of FIG. 8A, the second mirror has a rectangular shape that allows collecting all the light reflected by the first mirror surface. It corresponds to the same principle as shown in FIG. 1B, but with the beam splitter and the quarter wave plate placed between the two mirrors. This architecture reduces the number of components to assemble, and simplifies the whole optical system. In FIG. 8A, a laser diode 401 output light is collimated in a circular or elliptical beam with the use of an aspheric glass or polymer lens 402. The collimated light beam passes through the polarized cube beam splitter 403 and the quarter wave plate 400 and is reflected by the first moving surface 202 of the two 1DOF MEMS micro-mirrors 200. The light beam is then reflected onto the second 1DOF MEMS micro-mirror 200, which has a longer reflecting part in the direction of the rotating axis, long enough to collect all the light swept by the first 1DOF MEMS micro-mirror. The reflected light beam is then transmitted through the polarized cube beam splitter 403 into the projection plane.

Figure 8B:
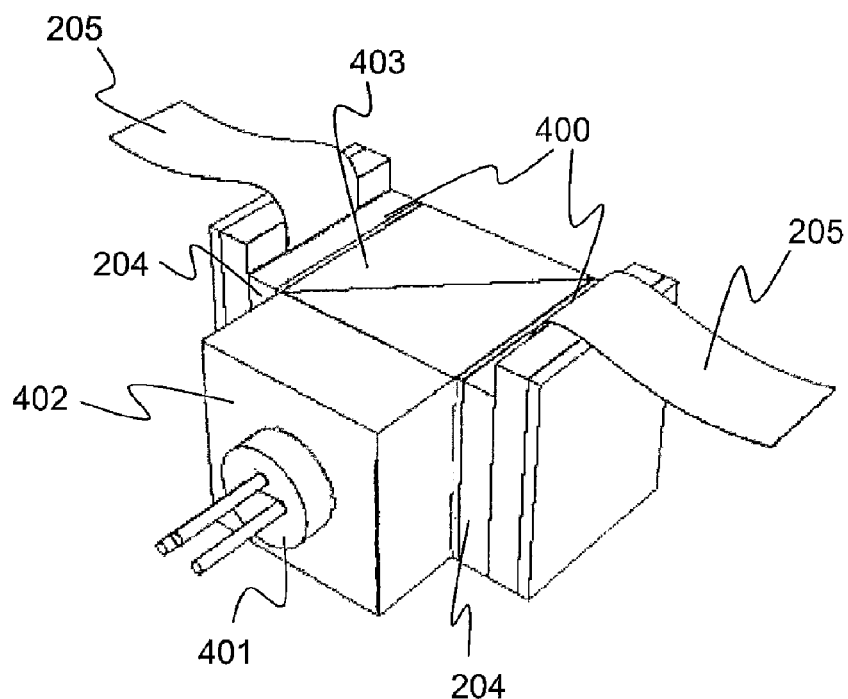
FIG. 8B illustrates architecture without the need of the lenses 404 between the cube beam splitter and the two mirrors.

FIG. 8B shows the same optical principle as FIG. 8A, with the two 1DOF MEMS micro-mirrors 200 placed one in front of each other. Similarly to the optical architecture depicted in FIG. 8A, the system of FIG. 8B has one of the two 1DOF MEMS micro-mirrors 200 long enough to collect all the light swept by the first 1DOF MEMS micro-mirror. As previously explained by FIG. 7B, this optical configuration with the two 1DOF MEMS micro-mirrors placed one in front of each other, as presented in FIG. 8B, helps in reducing the light losses in the polarized cube beam splitter 403.

Figure 8C:
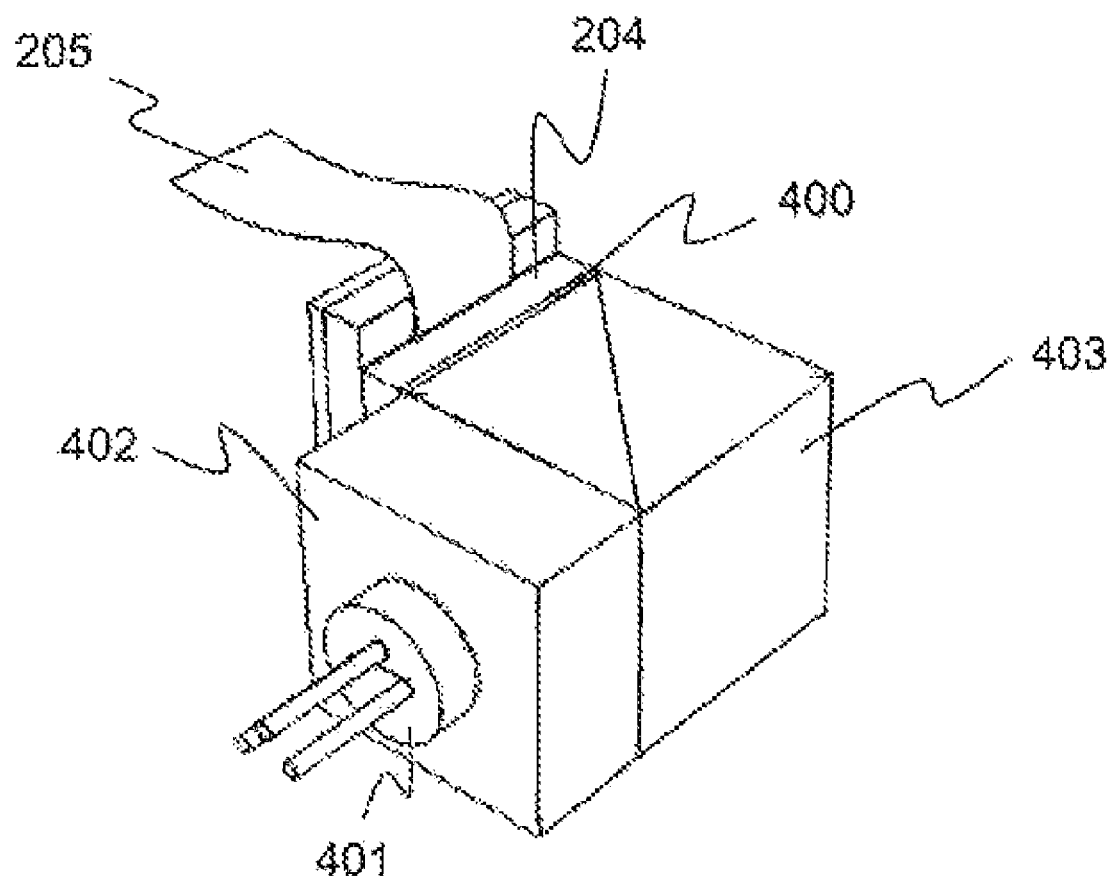
FIG. 8C illustrates another optical system architecture using a single 2DOF MEMS micro-mirror.

FIG. 8C shows another architecture for scanning or projection applications in which the two single 1DOF MEMS micro-mirrors of FIGS. 8A and 8B are replaced by one single 2DOF MEMS micro-mirror. The advantages of such new architecture are the reduction of the number of components in the system and the lower number of beam reflections inside the polarized cubic beam splitter 403. Another advantage consists in the light loss reduction inside the system. This architecture presents only one quarter wave plate 400 instead of two as previously described for FIGS. 8A and 8B.

Due to the direct contact of the components in the optical system, only small changes of refractive index will occur while the light is passing from one optical component to the next one, reducing the amount of light loss due to refractive index change reflection. This gain in optical power is considerably higher if all the optical components are glued together by using an adhesive coating having an optical refractive index similar to the one of the beam splitter 403 or the one of the micro-mirror cap window 204. Ideally, the MEMS micro-mirror cap 204 window should be made with similar material than the beam splitter 403 in order to further reduce optical loss.

Monochromatic scanning and projection can be achieved with the previous described architectures using a single laser source. For color projection with multiple laser sources, similar assembly concepts can be applied by specifically shaping a known beam combiner 800 optical module (FIG. 9A). The beam combiner 800 may be composed of multiple optical components 800A, 800B and 800C with specific coatings allowing to reflect certain wavelength and to transmit certain other wavelengths. In the case of FIG. 9A and FIG. 9B, the multiple laser sources 805, are arranged in parallel one to the others and placed perpendicularly to the beam combiner 800 along its length. If the optical coating is defined for the wavelength of each light source, the resulting beam at the output 804 of the beam combiner is composed of the superposition of each of the light sources. If all of the light sources are collimated individually with the use of three lenses 801A, 802A, 803A, the resulting combined beam will also be collimated. FIG. 9C illustrates another composition with a beam combiner 806 that could be used to mix the different light beams together.

The proposed architecture for color projection is using three light sources, typically red, green and blue to achieve the visible spectrum range. However this architecture is not limited to three light sources and to the visible spectrum, but can be expanded to multiple light sources and to the other part of the spectrum, which can help to achieve a wider spectral range.

Figure 10:
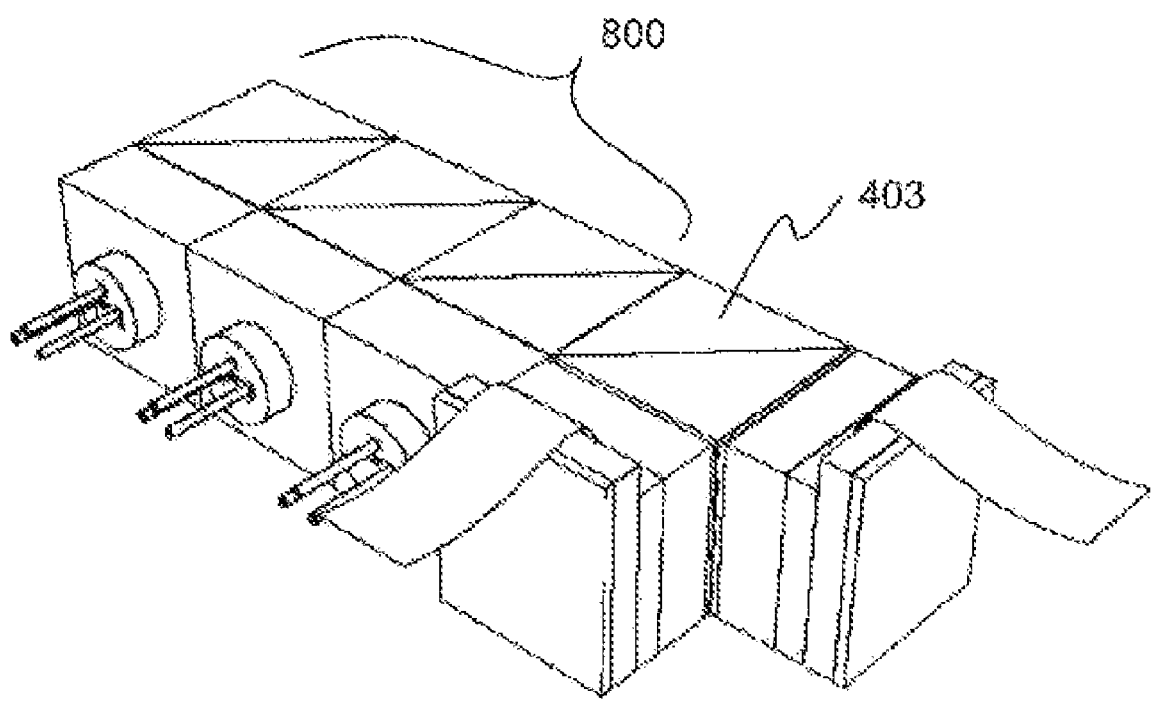
FIG. 10 represents the combination of color mixing presented in FIG. 9A with the projection architecture of FIG. 8A.

FIG. 10 represents a system in which the beam combiner of FIG. 9A is used within a projection architecture similar to the one of FIG. 5A. In FIG. 10, the beam combiner 800 is specifically designed in order to have the same side dimensions as the polarized cube beam splitter 403. Ideally the beam combiner 800 is made of the same material as the polarized cubic beam splitter 403 in order to avoid any reflection or light loss between the two materials. The projection system shown in FIG. 10 is assembled in stacked monolithic blocks by using the technology depicted in FIG. 4B, involving mutually cooperating contact faces. All the projection architectures presented in FIGS. 8A, 6A, 8B and 8C can be applied to the complete projection system of FIG. 10.

Figure 11A:
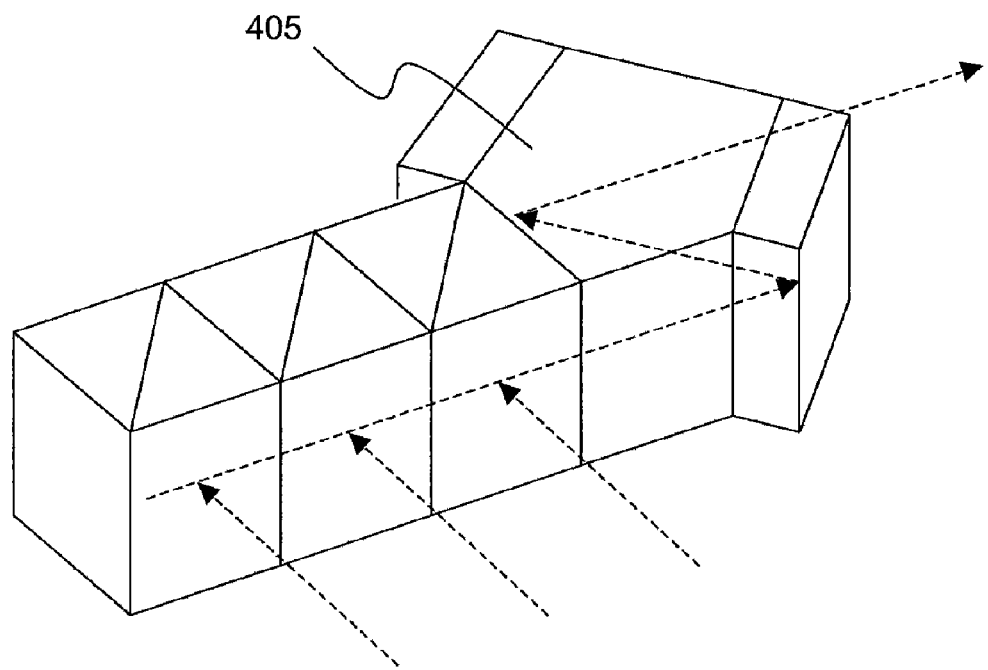
FIGS. 11A and 11B illustrate other architectures for scanning and projection purposes, using a different central block shape, in which the optical components are fixed.
Figure 11B:
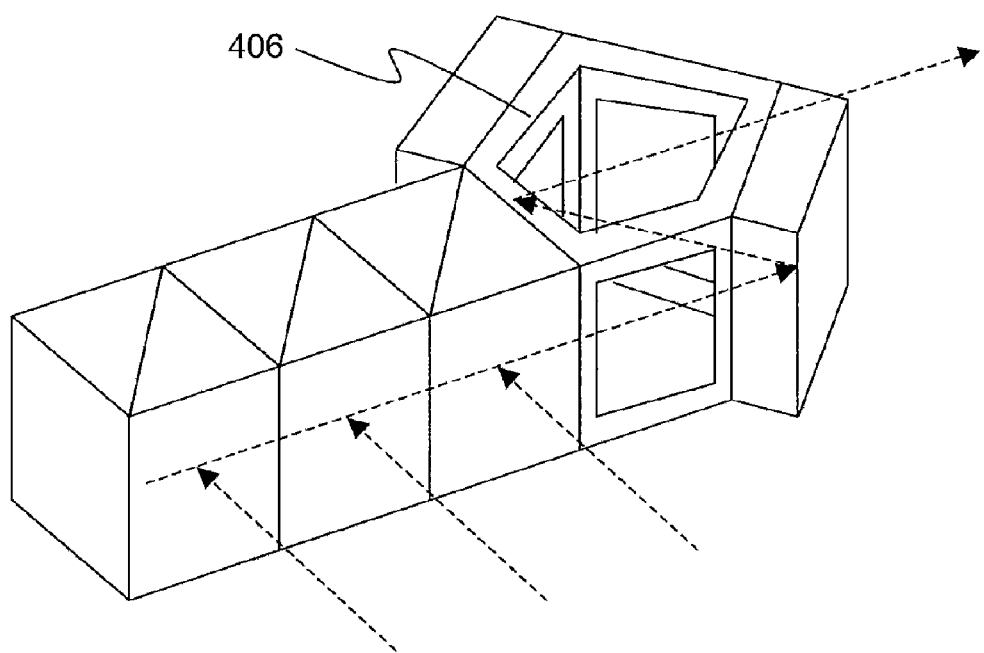

Further proposed optical architectures for scanning and projection purposes are described in FIG. 11A and FIG. 11B. The two architectures present a central body 405 respectively 406 onto which other optical components can be aligned and attached, following the alignment and assembling technique proposed and depicted in FIG. 4B. The central body can be made of glass, polymer or another bulk or hollow material. This different optical system can be used with any of the above mentioned architectures that are working with monochromatic or multiple color laser sources. These architectures have the advantage of further reducing the number of optical components needed for scanning and projection purposes.

To further reduce the number of components in the proposed systems, part of the beam combiner can be fabricated together with part of the beam splitter. In a subsequent manner, the collimation lenses, part of the beam combiner and part of the beam splitter can also be made in a single mold.

Laser sources have been described as light sources in the present invention. Those skilled in the art will also understand that the here-above described light sources 401 and 805 can be applied either as laser diodes, Vertical Cavity Surface Emitting Diodes (VCSEL), Super luminescent Light Emitting Diodes (SLED), but also optically fiber guided or collimated Light Emitting Diodes (LED). Such alterations, modifications and improvements are intended to be within the spirit and scope of the invention.

Figure 2:
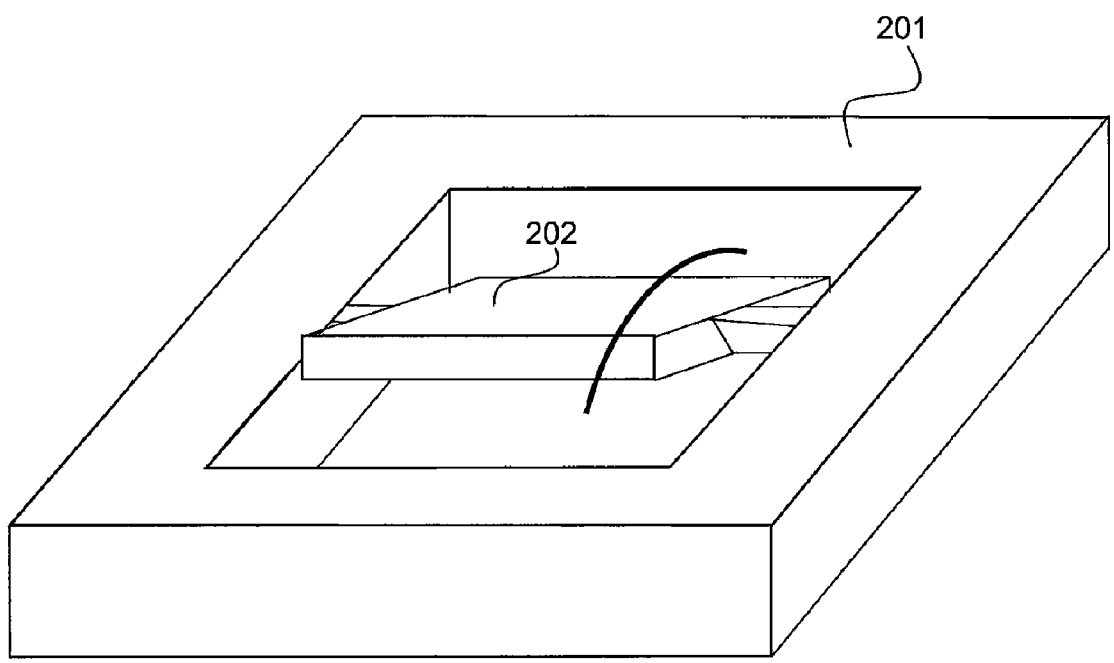
FIG. 2, described above, illustrates an example of a known MEMS micro-mirror under actuation, having a tilt relatively to the holder plane.

The shape of the MEMS scanning micro-mirror is not limited to the geometry presented in FIG. 2 but can also have a circular or an elliptical shape. The described innovative architectures can be either applied for fully or partially encapsulated MEMS scanning micro-mirror based on electrostatic, electromagnetic, thermal and piezoelectric actuation principles.

The invention claimed is:

1. An optical micro-projection system comprising the following components:
    at least one light source;
    at least one mirror based on MEMS technology for deviating light from said light source;
    at least one beam splitter;
    at least one wave plate for changing polarization of the laser beam;
    wherein each component have parallelepiped profiles with contact faces on at least one side and wherein the components are arranged in a stack so that mutual alignment of each of said components is provided by mutual direct contact between contact faces of said components.

2. The optical micro-projection system of claim 1, wherein said beam splitter has at least two contact faces and said waveplate has two contact faces on opposite sides.

3. The optical micro-projection system of claim 1, wherein said contact faces have an optical flatness which is equal to at least ¼ lambda, wherein lambda is equal to 632.8 nm.

4. The optical micro-projection system of claim 1, comprising a frame for holding said components, at least some components comprising reference side faces for alignment with said frame.

5. The optical micro-projection system according to claim 1, wherein said MEMS component is a fully encapsulated scanning micro-mirror placed behind a cap window providing a contact face.

6. The optical micro-projection system according to claim 1, comprising a lens made of gradient index medium, which is configured to have a parallelepiped profile and at least one contact face provided by the gradient index medium.

7. The optical micro-projection system according to claim 1, wherein adjacent micro optical components have the same refractive index.

8. The optical micro-projection system according to claim 1, wherein adjacent components are made of the same optical material.

9. The optical micro-projection system according claim 1, comprising at least two light sources placed parallel one to the other, and wherein during operation, the light beams are reflected into a beam splitter.

10. The optical micro-projection system according to claim 1, comprising at least two light sources placed perpendicular one to the other, and wherein during operation, a beam combiner transmit the combined light in the same direction as the output light source.

11. The optical micro-projection system according to claim 1, comprising at least three light sources placed perpendicular one to the others with a central beam combiner.

12. The optical micro-projection system according to claim 1, further comprising a beam combiner arranged in optical communication with the at least one laser.

13. The optical micro-projection system according to claim 1, wherein said light source is provided in a laser holder for supporting said light source and providing at least one contact face.

14. A method for assembling an optical micro-projection system according to claim 1, comprising the steps of:
    providing at least two substantially perpendicular reference planes;
    placing optical system modules to be assembled in pre-assembling positions, said modules having parallelepiped profiles with at least one contact face, said contacts faces facing each other;
    adjusting said modules in close cooperation with reference planes so that the modules are aligned for proper operation of the optical system;
    stacking the modules so that contact faces contact each other, so as to achieve alignment of the modules;

using assembling means to connect the modules in order to provide said optical system.

15. The optical micro-projection system of claim 1, wherein each of said at least one beam splitter has a first contact face at a first side and a second contact face at an at least one second side, each of said at least one light source has a first contact face at a first side and a second contact face at a second side, each of said at least one wave plate has a first contact face at a first side and a second contact face at a second side, and each of said at least one mirror has a first contact face at a first side, wherein the first contact face of said at least one light source is stacked with the first contact face of said at least one beam splitter, the first contact face of said at least one wave plate is stacked with the at least one second contact face of said at least one beam splitter, and the first contact face of said at least one mirror is stacked with the second contact face of said at least one wave plate.

16. The optical micro-projection system of claim 1, wherein at least some of the contact faces are of equal area so that alignment of the perimeters of the contacted faces of successive components in the stack achieves the mutual alignment of the components.

* * * * *